United States Patent [19]

Hunt

[11] Patent Number: 4,972,801
[45] Date of Patent: Nov. 27, 1990

[54] PUMPING SYSTEM FOR PRODUCING OXYGEN ENRICHED WATER USEFUL IN THE GROWING OF AQUATIC LIFE

[76] Inventor: Robert D. Hunt, 23707 Redfish Ln., Pass Christian, Miss. 39571

[21] Appl. No.: 232,310

[22] Filed: Aug. 15, 1988

[51] Int. Cl.$^5$ ............................................. A01K 63/04
[52] U.S. Cl. ........................................................ 119/3
[58] Field of Search ............................................ 119/3

[56] References Cited

U.S. PATENT DOCUMENTS

| | | | |
|---|---|---|---|
| 3,279,430 | 10/1966 | Mugridge | 119/3 |
| 4,044,720 | 8/1977 | Fast | 119/3 |
| 4,765,807 | 8/1988 | Henriksen | 119/3 X |
| 4,798,168 | 1/1989 | Vadseth et al. | 119/3 |

Primary Examiner—Robert P. Swiatek
Attorney, Agent, or Firm—Pravel, Gambrell, Hewitt, Kimball & Krieger

[57] ABSTRACT

A plurality of reservoir tanks, which receive water from a deep water well, in order to provide a water habitat for the fish contained therein. The water received from the deep water well is injected with pressurized oxygen at a deep sufficient to cause the oxygen to be dissolved in the water, so that when the water is injected into the tank, the water is highly saturated with oxygen, and therefore, provides an oxygen rich environment which enhances the growth of the fish in the tank. The system may be utilized in conjunction with a vaster type of fish pond, wherein a plurality of tanks would provide a quantity of water into the pond, so that in addition to the fish being raised in the tanks, the fish may be raised in the pond adjacent the tanks and therefore achieve the same type of high oxygen rich environment.

16 Claims, 5 Drawing Sheets

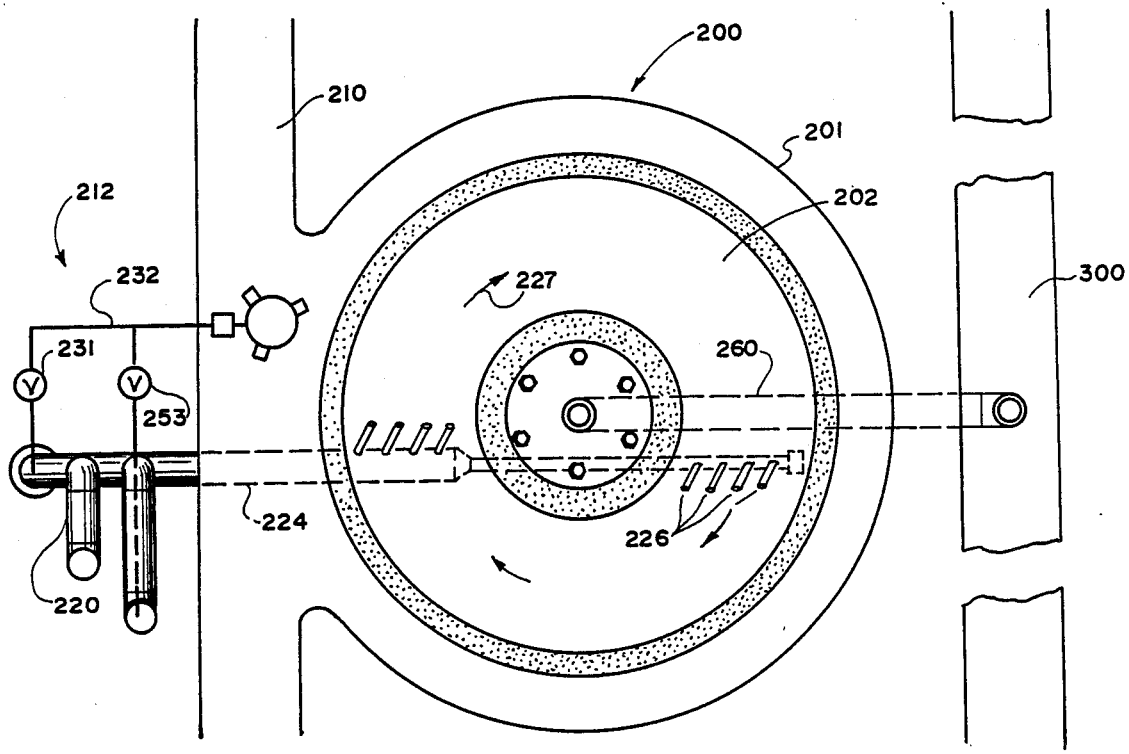
F I G. 6
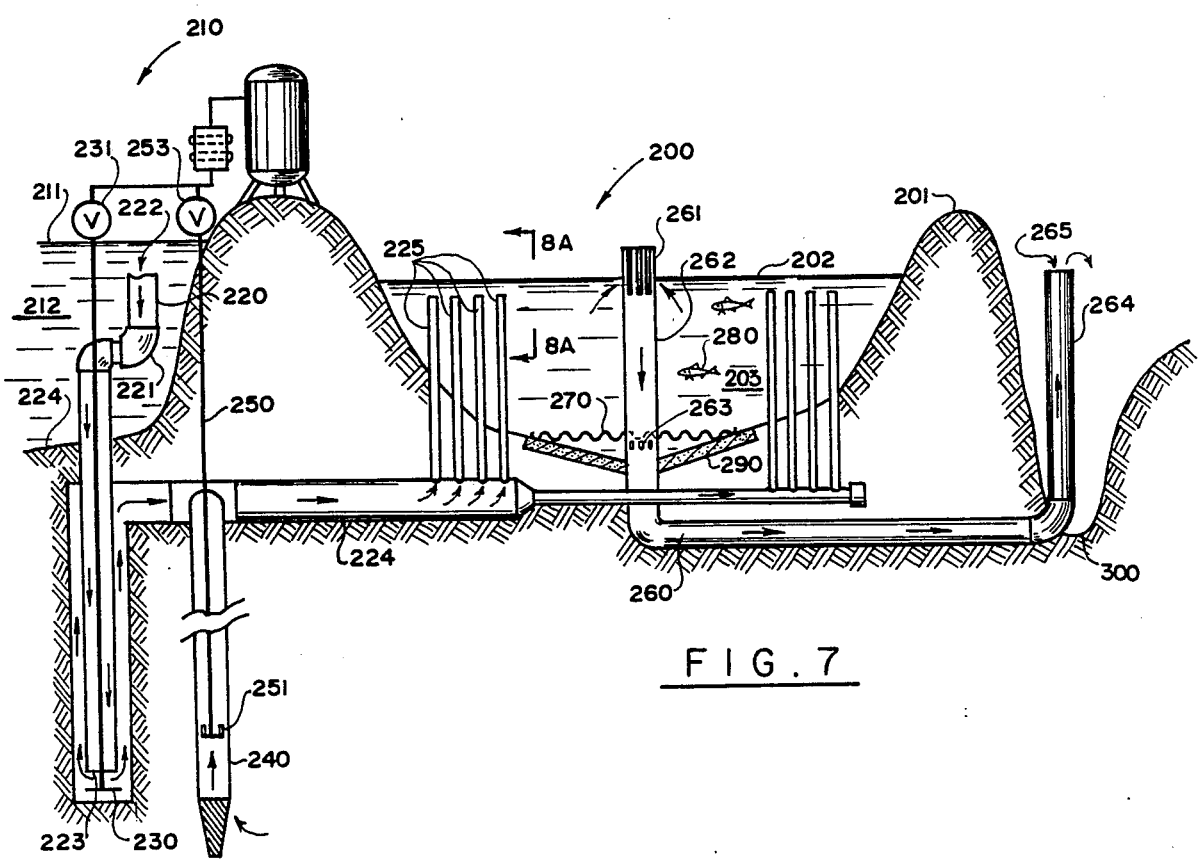
F I G. 7

PUMPING SYSTEM FOR PRODUCING OXYGEN ENRICHED WATER USEFUL IN THE GROWING OF AQUATIC LIFE

BACKGROUND OF THE INVENTION

1. Field of the Invention

The system of the present invention relates to growing aquatic life in a controlled environment. More particularly, the present invention relates to a system for establishing a large high density aquatic culture through the use of reservoir water and/or pumped, air lifted geo-thermal well water having deep oxygen injection under pressure to obtain a high level of oxygen saturation in the water. The system effluent can be used in agriculture as irrigation water because it is typically rich in ammonia and nitrogen, nutrients for plant life.

2. General Background

At the present time, there has arisen a need for the raising of aquatic life, such as redfish, or other popular menu fish, which at one time were abundant in their natural freshwater or salt-water habitat, but due to conditions which have arisen and the shortages which are present, alternative means of raising sufficient quantities of such fish must be found. One such means which is known as "fish farming", has been utilized in attempting to raise fish in a controlled environment, so that the fish may grow at an accelerated rate to provide the fish that cannot be found in sufficient quantities in the natural habitat. However, some of the problems that have been confronted in fish farming is the great expense in maintaining the fish in ponds or the like environment, with sufficient oxygen and food, so that the fish do in fact grow to a marketable size. In the past, this has been a very difficult obstacle to overcome, and has been usually unachievable. The present system allows control of all of the environmental factors affecting the health of aquatic life, i.e., high level of oxygen saturation, high level of water exchange, adequate cultivation area, constant temperature control, continuous removal of waste products, free gaseous exchange of water/air, etc., to be continuously maintained at construction and operating costs equal to or less expensive than traditional pond culture.

There are several patents listed below which have been issued relating to fish farming, and the subject matter of aeration of ponds or the like.

| U.S. PAT. NO. | INVENTOR | TITLE |
|---|---|---|
| 4,522,151 | Arbisi, et al. | "Aerator" |
| 4,171,681 | Berger, et al. | "Fish Tank System" |
| 4,708,090 | Molaug, et al. | "Method For Feeding Fish" |
| 4,240,376 | Kominami, et al. | "Method for Keeping Aquatic Animals Alive Over Long Periods Of Time" |
| 3,996,893 | Buss | "Fish Husbandry System" |
| 4,699,420 | Swanson | "Fish Farming System And Method" |
| 4,488,508 | Heideman | "Aeration/Circulation Method And Apparatus Utilizing Low Pressure Air" |
| 4,116,164 | Shabi, et al. | "Method Of Fish Farming" |

SUMMARY OF THE PRESENT INVENTION

The system of the present invention relates to a method of establishing a large high density fish culture system utilizing reservoir water and/or pumped/air lifted geo-thermal well water, each type of water having deep oxygen injection under pressure in order to achieve a high level of oxygen saturation. What may be provided is a plurality of tanks, which receive water from a deep water well, in order to provide a water habitat for the fish contained therein. The water received from the deep water well is injected with pressurized oxygen at a depth within the well sufficient to cause the oxygen to be dissolved in the water, and to lift/pump water so that when the water is injected into the tank, the water is highly saturated with oxygen, and therefore, provides an oxygen rich environment which enhances the growth of the fish in the tank. The system may be utilized in conjunction with a larger fish pond and/or supply reservoir for irrigation, wherein a plurality of tanks would provide a quantity of the oxygen-enriched water into the pond, so that in addition to the fish being raised in high density in the tanks, the fish may be raised in low density in the pond adjacent the tanks and therefore achieve the same type of high oxygen rich environment.

Therefore, it is a principal object of the present invention to provide a system for raising aquatic animals, such as fish in a high level of oxygen saturation in the water and with a high rate of water exchange;

It is a further object of the present invention to provide a system for creating a high density fish culture system using reservoir water and/or pumped/air lifted by injection of oxygen deep into the well to produce geo-thermal well water, each having deep oxygen injection under pressure
to obtain a high level of oxygen saturation; and It is a further object of the present invention to provide a system for raising fish utilizing deep well water injected with oxygen under pressure to pump/air lift the constant temperature water and for achieving an oxygen saturated water for use in a fish growing tank achieving a reduced growth period due to constant temperature control and a high rate of water exchange removing metabolic wastes, uneaten food and fecal material continuously.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 6 is a plan view of an alternate embodiment of the present invention;

FIG. 7 is an elevational view of an alternate embodiment of the present invention;

DETAILED DESCRIPTION OF THE PREFERRED EMBODIMENT

Figure 1:
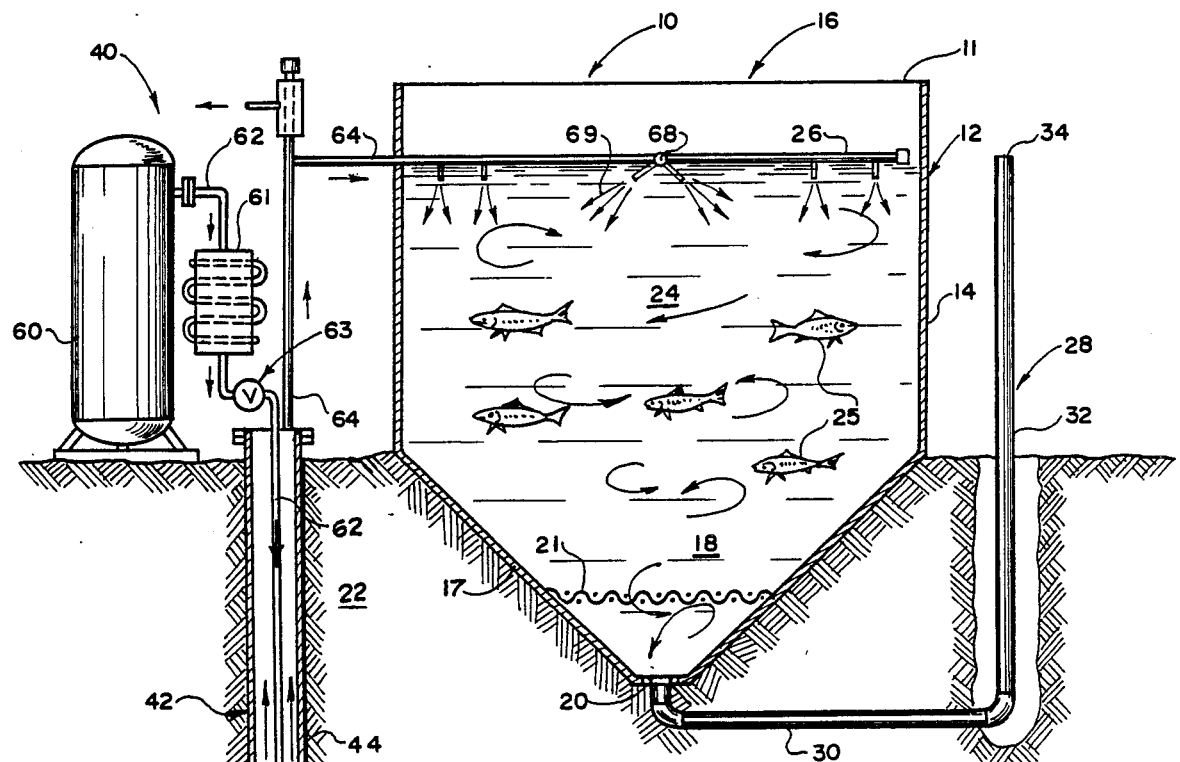
FIG. 1 illustrates in side view the preferred embodiment of the system of the present invention.

The system of the present invention is illustrated in FIGS. 1–4 by the numeral 10. As illustrated, particularly in FIG. 1, system 10 comprises a tank 11 having an upper tank portion 12 which is defined by a continuous annular sidewall 14, an open ended top 16, sidewall 14 formed into a lower conical wall 17, defining conical bottom portion 18, having a sediment concentrating lower end 20. There is further provided a screen 21 positioned within bottom 18 to confine fish 25 within tank 11 and to allow water and waste to flow into lower end portion 20. The waste desirably exists flow line 30 with out-flowing water. The waste can include uneaten food, fecal matter, and metabolic waste (dissolved organics). As illustrated, tank portion 12 is positioned so that upper tank portion 12 is above ground, the lower conical wall 17, and conical bottom 18 are set within the ground 22. In the preferred embodiment, tank 11 would be filled with a volume of water 24 up to a level 26, and there would be included an overflow stand-up pipe 28 extending from the lower end 20, pipe 28 including a first horizontal section 30, and the second vertical section 32 ending at an open end portion 34 which would allow any excess water to drain from overflow pipe 28, up to the level of the water 26 within tank 11.

Tank 11 would be used primarily for growing aquatic animals such as fish 25, particularly redfish, in an oxygen enriched volume of water 24, in keeping with the present invention. Therefore, in order to achieve this end, there is included a means for providing tank 11 with a continuous supply of oxygen enriched water, that means as illustrated by the numeral 40, in FIG. 1. As illustrated, oxygen enriched supply means 40 includes a deep water well portion 42 which comprises a vertically extending water well casing 44, extending into the earth at sufficient depth for allowing water contained within the surrounding strata 47 to enter into the end portion 46 of casing 44 as illustrated by arrows 49, and travel upward annulus 50 of casing 44. At the end portion 46 of casing 44 there is included a water filter screen 48, which would be a standard type of strainer used in a water well, for filtering out any particles contained within the water, as the water travels upward in the direction of arrows 52 within annulus 50.

Figure 2:
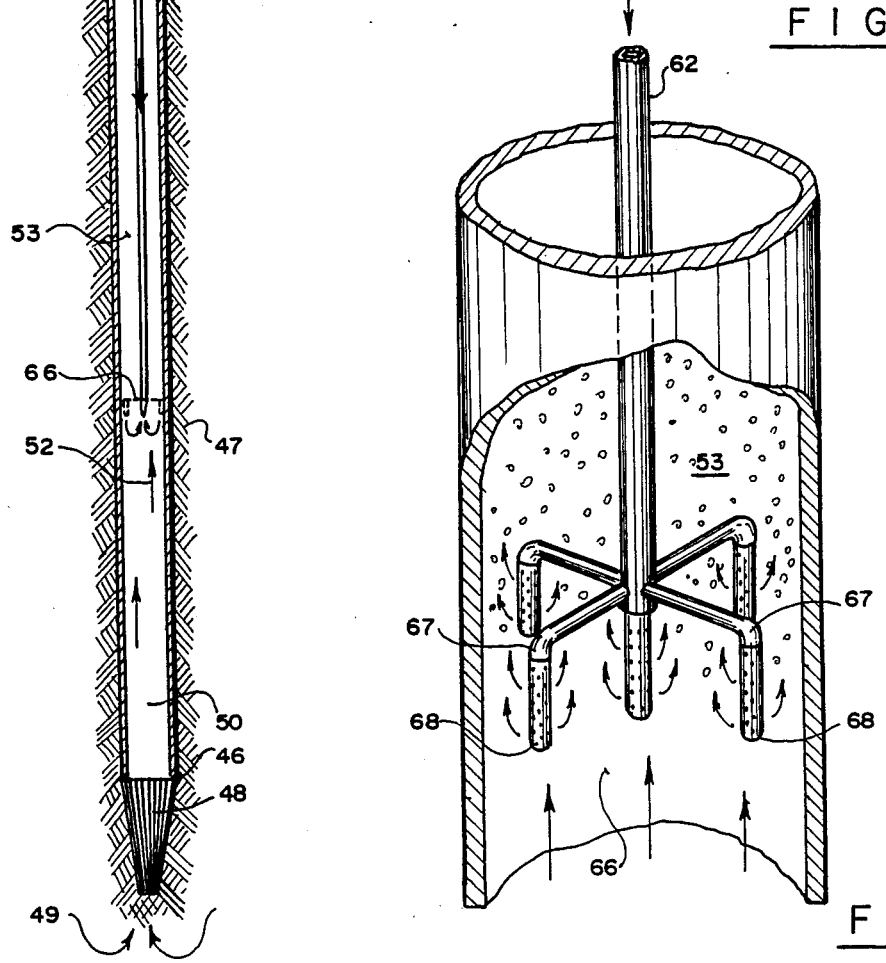
FIG. 2 illustrates an isolated view of the air diffusion system in the present invention.

At a point substantially deep within the annulus of casing 44, the system would include a means for oxygen enriching the water within casing 50, and at the same time serving as a means for lifting the water as the water enters casing 44 and travels upward towards the surface of the earth. This means would incorporate, on the surface, a tank 60, wherein pure oxygen would be maintained under pressurization, or in the alternative, tank 60 would be an oxygen generator, which would generate compressed oxygen during use. The compressed oxygen contained, for example, in tank 60, would travel through an air line 62, through a heat exchanger 61, with air line 62 entering the upper portion 44A of casing 44 of well 42. Air line 62 would extend down a sufficient distance, at sufficient depth to obtain adequate pressurization down the length of the casing 44, which would carry compressed oxygen within the line 62. As illustrated in FIG. 2, line 62 would terminate in a plurality of oxygen diffuser means 66. The volume of oxygen supplied to diffusion means 66 is regulated by supply valve 63. The percentage of oxygen saturation and quantity of water produced are proportional to the quantity of oxygen supplied by valve 63.

As illustrated more clearly in FIG. 2, diffusion means 66 would include a plurality of nozzles 67, each including a plurality of orifices 68 in the wall along the wall portion of each nozzle 67, thereby allowing oxygen to exit each nozzle 67 and enter the volume of water 53 contained within casing 44. At the depth that the nozzles 67 are located within the well 42, the water would be under sufficient pressure due to the hydrostatic head of the volume of water within casing 44, that the oxygen would saturate the water at that depth, and would be substantially dissolved within the water. However, as the water would travel upward in the direction of arrows 52, the reduction in the pressure of the water would allow the oxygen bubbles to expand increasing (approximately doubling) in size with each atmosphere (33.9) feet of $H_2O$ or 14.7 PSI) of pressure reduction as the oxygen bubbles expand water is displaced pushing it upward towards the area of lower pressure, and in effect serve as a means for carrying the water 52 above the surface of the well, and upward through delivery pipe 64 above the surface, wherein the oxygen enriched water would travel horizontally in pipe 64, and would be distributed into the water 24 of the tank 14, as illustrated by arrows 69, so that the water within tank 14 would have a constant flow of oxygen enriched constant temperature water for the growth of aquatic animals. A vent 65 (FIGS. 1 and 4) is used to relieve excess oxygen pressure and undesirable gasous oxides e.g., iron oxide, sulphur oxides, etc. It should be noted that oxygen is used rather than compressed air. Air contains a high percentage of nitrogen. Nitrogen saturation is detrimental to survival of aquatic life. For example, fish can develop nitrogen bubbles (or a bubble) in the fin area, causing mortality.

Figures 3, 4:
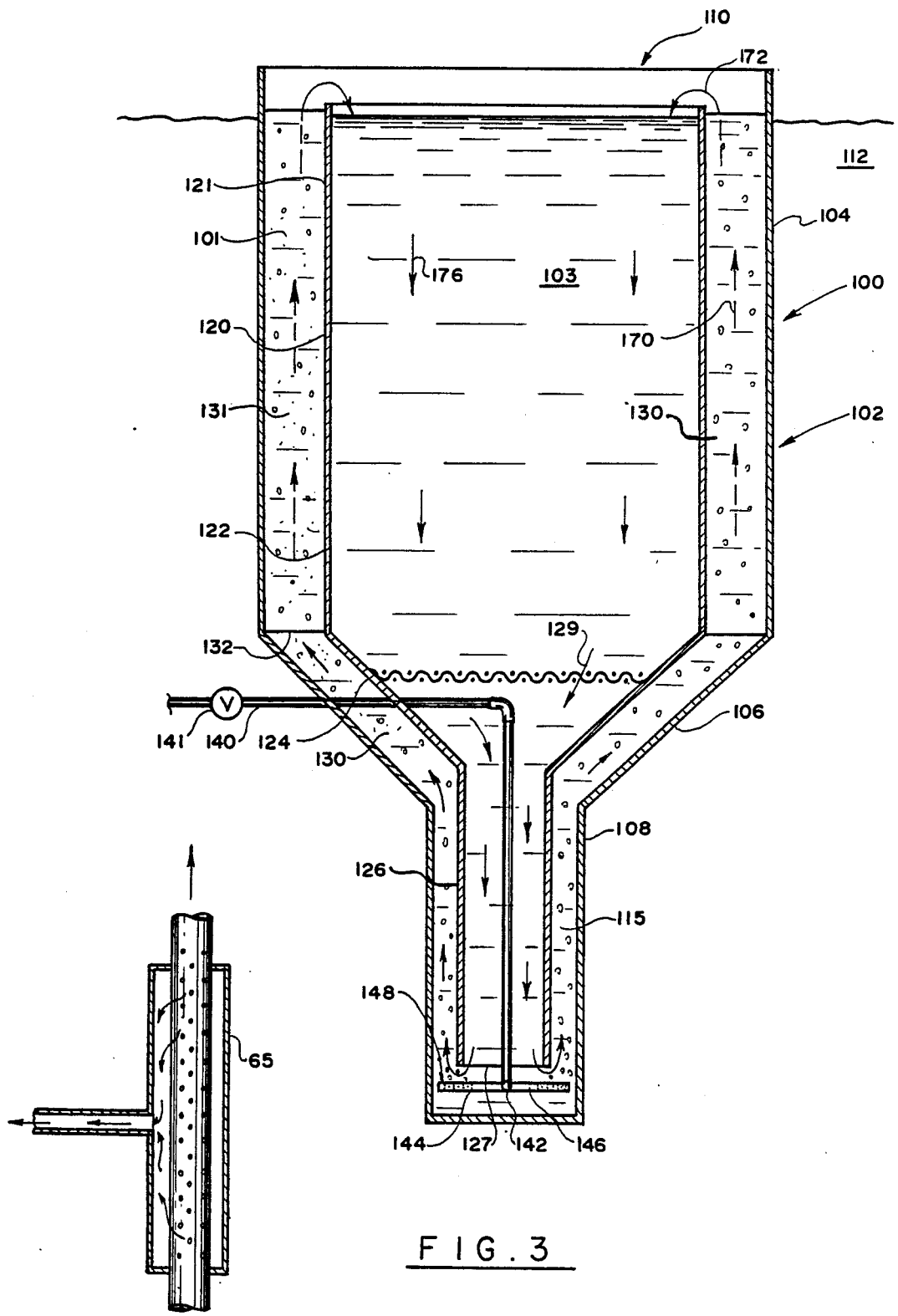
FIG. 3 illustrates an overall composite view of the system of the present invention incorporated into a low density aquatic animal pond and/or supply reservoir for use in agriculture for irrigation of farm crops.
FIG. 4 illustrates an isolated view of the air vent system of the apparatus as illustrated in FIG. 1.

As illustrated in FIG. 3, each tank 14 would be provided with at least four oxygen enriched water distribution lines 64 at its surface, with each line 64 having a plurality of nozzles 68 distributing oxygen enriched water into the water 24 within tank 12. This manner of distribution within the water of tank 12, would create a swirling effect as indicated by the curved arrows in FIG. 1, and would in fact allow any heavier extraneous matter to swirl downward to pass through screen 21 into the lower tank 20, to be concentrated at the conical bottom 18 and flow through pipe 28 with discharge overflow water 34.

Figure 5:
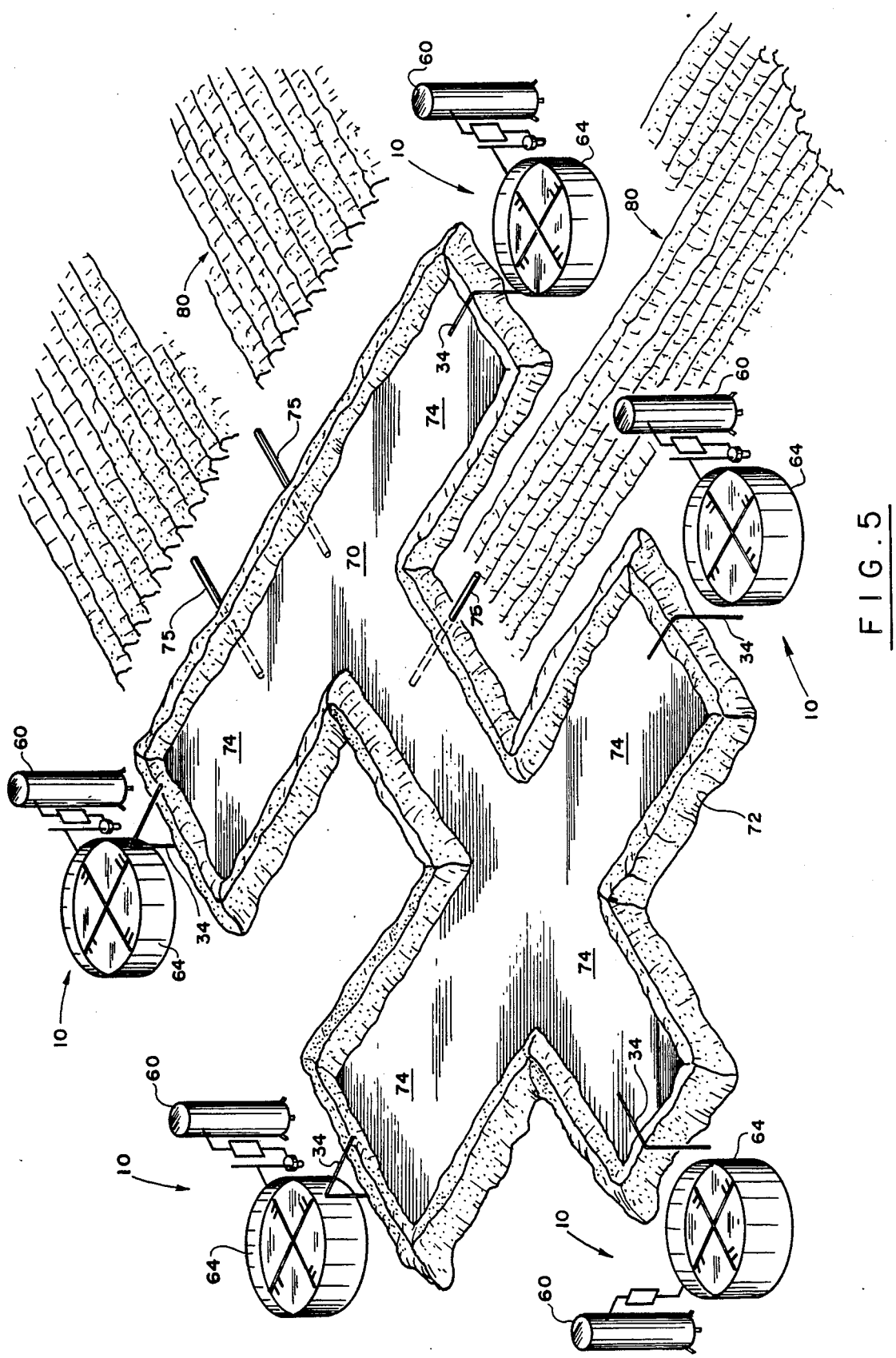
FIG. 5 illustrates an alternative oxygen enriched water circulation system of the present invention.

One application of the present system of the invention is illustrated in FIG. 5, wherein a water storage reservoir pond 70 has been formed by a continuous levee 72, to produce a number of sections 74, a section 74 may be, as seen in the FIGURE, provided with a system 10 of the present invention as illustrated. In this particular use of the system, the enriched water from each tank 12 would be overflowed via line 34 into the pond 70 and therefore as fish were being raised in a confined area at high density within each tank 12, the oxygen enriched water overflow from line 34 would be spilling into pond 70, and thereby oxygen enriching the water which would be contained in pond 70. Therefore, as each line 34 spilled over into pond 70, it is foreseen that the vast quantity of enriched water being introduced would likewise totally enrich the water in pond 70, and allow a farmer or the like to raise aquatic animals within pond 70 at low density, while simultaneously utilizing the system 10 of the present invention as illustrated in FIG. 3.

Another application of the present system of the invention is also illustrated in FIG. 3, wherein a water storage reservoir 70, is used to supply water by gravity feed 75 for use of agriculture for irrigation of farm crops 80. The water being rich in plant nutrients.

As an adjunct to the system of the present invention, reference is made to FIGS. 4 and 5. FIG. 3 illustrates an apparatus 100 which would be a self-contained tank for receiving oxygen into the water for enriching the water as the water is circulated through the tank. As illustrated, apparatus 100 would include an outer tank portion 102 having an annular wall 104, a truncated conical bottom 106 which leads into a vertical lower section 108, the entire tank substantially located beneath the ground, with the upper portion being open ended at end 110 and extending above the surface of the ground. Contained within tank 100 would be a second tank 120 configured in the same shape as tank 100, having an annular upper sidewall 122 a truncated conical bottom wall 124 likewise leading into a vertical lower portion 126. However, inner tank 120 would be a diameter less than the diameter of tank 100, so that there is defined an annular space 130 between the inner wall 101 of tank 100 and the outer wall 121 of tank 120. This annular space 130 would be provided throughout the entire length of the tanks from the upper portion through the lower end portion. Further as illustrated the upper end of wall 104 of tank 100 would be at a slightly greater height than the upper end of the wall of tank 120 the reason for which will be discussed further.

There is further illustrated in FIG. 3, an oxygen delivery line 140, entering tank 100 below screen 129, which would deliver pure oxygen or the like from an oxygen compressor of tank containing compressed oxygen, a valve 141 would control the rate of flow of oxygen entering line 140, as though the system 10 discussed previously so that oxygen line 140 would enter and extend through the walls 106 and 124 of the tanks 100 and 120 respectively, and extend downward through the center of the vertical portion 126 of inner tank 120. At its lower end, line 140 would form a Tee 142, with each leg 144 and 146 of Tee 142 including a plurality of oxygen diffusion ports 148, wherein oxygen would be diffused into the lower most annular space in vertical section 108 of tank 100, and due to the fact that the oxygen is being diffused at that great a depth below the surface 112 of the earth, the oxygen will become saturated and dissolve into the water 115 within the annular space 130, and as water moved upward within space 130, the oxygen bubbles would rise and expand due to a reduction in pressure, and serve as a means for lifting the water upward surrounding the space 130 in the direction of arrows 170, and the oxygen enriched water would spill over in direction of arrows 172 into the main body of water 103 in inner tank 120. At that point, the oxygen enriched water would circulate down in the direction of arrows 176, into inner vertical section 126 of inner tank 120, and on reaching the lower open end 127 of tank 120, would move into the annular space 130 and would recycle up through annular space 130 through a bio-filtration medium 131 contained by screen 132 and spill over into inner tank 120 as was discussed earlier. The medium can be commercially available crushed coral medium for example, calcium in the crushed coral buffers Ph loss or drop. The surface of the coral is a growth medium for nitrifying bacteria that remove ammonia and nitrogenous compounds. Therefore, the mere introduction of oxygen into the lower portion of the tank of the tank system, would create a continuous circulation effect as the oxygen moves from the diffuser pipe and rises upward increasing in size carrying the water volume up through annular space 130 to spill over the top of inner tank 120 and to move down with the volume of water in tank 120 downward to be recycled through the annular space 130 and to receive more enriched oxygen flow. As foreseen, the volume of water 103 within tank 120 could contain a great number of aquatic animals, to be grown therein. Inner tank 120 would be equipped with a screen 129 along wall 124 between the lower end of conical wall 124 and vertical portion 126, so that any debris contained within tank 103 would be maintained within the upper portion, but the water could continue to circulate through the tank.

FIGS. 6-9 illustrate an alternate embodiment of the present invention designated by numeral 200. System 200 comprises an earthen pond created by a circular levee 201. Oxygen enriched water is supplied from a water containing reservoir 210 holding the water level 211 at an elevation feet (e.g., 3-6 feet) higher than the water level 202 contained by the circular level 201.

Figures 8, 8A:
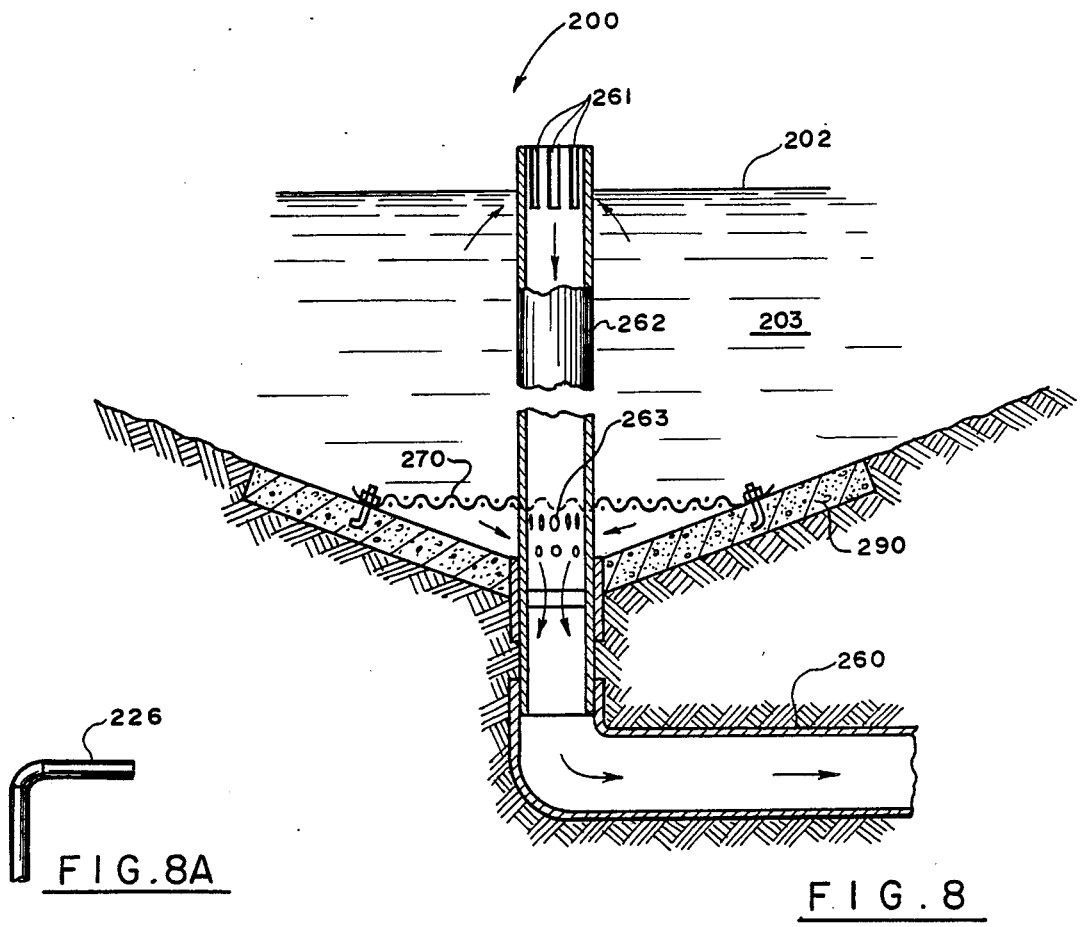
FIG. 8 is an elevational, fragmentary view illustrating the alternate embodiment of the present invention.
FIG. 8A is a sectional view taken along lines 8A—8A of FIG. 7.

Water 212 from the reservoir gravity feeds through submerged pipe 220 which swivels 221 to raise or lower the open end 222 of pipe 220 above or below the surface of the water level 211 of the reservoir 210. The water travels downwardly underground in pipe 220 and undergoes pressurization and is oxygen injected as illustrated in FIG. 5 and 8. The water returns upward in pipe 224 in the annulus between pipe 220 and pipe 224 after passing through the open end 223 of pipe 220. The upward flow of the water in pipe 224 is accelerated by the rising and expanding oxygen bubbles released by the oxygen diffuser apparatus 230.

The water passes into system 200 through a plurality of smaller pipes 225 with directional effluent ports 226 which direct the circular flow of water within system 200 indicated by Arrows 227. An oxygen supply line 232 supplies oxygen to the diffuser 230 and a valve 231 regulates the quantity of oxygen delivered to the oxygen diffuser 230. Likewise, water may be air-lifted into pipe 224 from a geo-thermal deep well 240 as illustrated in FIGS. 1 and 7.

The air-lifted water produced enters system 200 through pipes 225 and directional effluent ports 226 as described above. The oxygen line 250 supplies oxygen to the diffuser 251 in the well 240. The quantity of oxygen is regulated by valve 253 to the diffuser 251. The percentage of oxygen saturation and quantity of water produced are proportional to the quantity of oxygen supplied by valve 253.

Water 203 contained in system 200 exists through pipe 260. The water 203 enters the stand-pipe 262 through surface slots 261 and through holes 263 at the base of the stand-pipe 262 after passing through a perforated plate 270 which retains fish 280 and allows solid waste and dissolved organic compounds to flow through pipe 260 to vertical overflow pipe 264, to overflow the open end 265 of overflow pipe 264. The holes 263 in the stand-pipe are preferably not sufficient to carry the entire volume of water being introduced into the system 200 by the reservoir supply pipe 220 and/or geo-thermal well 240. The volume of water that cannot pass through the holes 263 must pass through the surface slots 261. This removes the surface 202 oil film caused by the breakdown of amino acids (proteins) which stop the exchange of gases between the water and the air which is beneficial. The water is carried away by an open ditch 300 by gravity flow. Thus, a balance of flow as desired can be achieved between surface discharge via slots 261 and deep discharge via holes 263 and outlet pipe 260.

The center of system 200 is preferably concreted at 290 and the perforated plate 270 is bolted to the concrete with lag bolts 271. The lag bolts 271 can be arranged in a circular manner around the perimeter of the perforated plate 270 (see FIG. 9).

Figure 9:
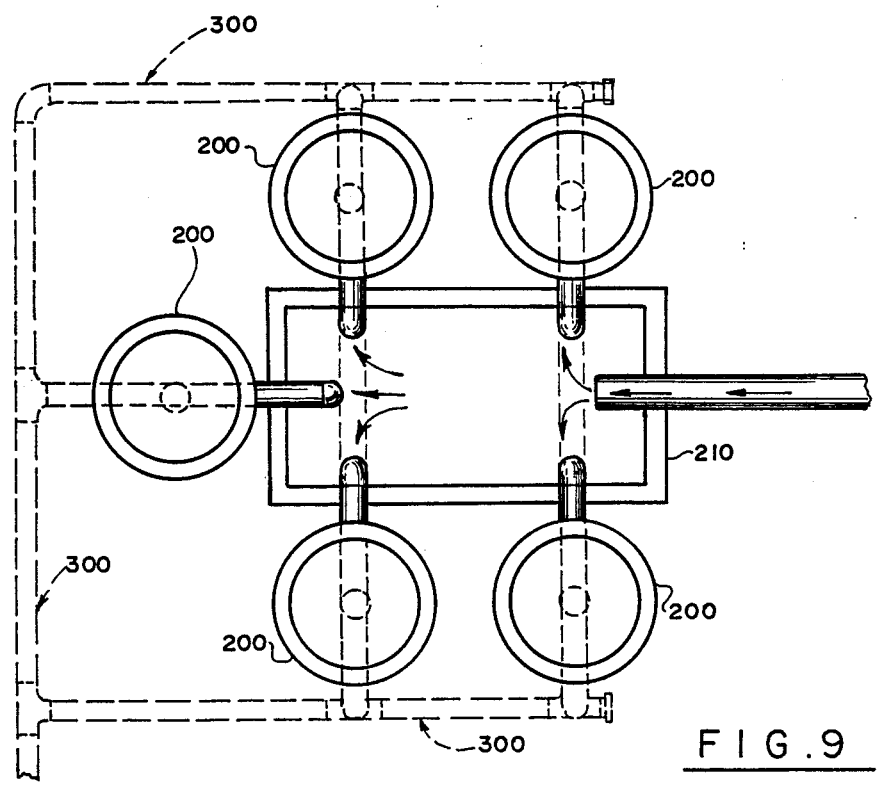
FIG. 9 is a plan view of the alternate embodiment of the present invention illustrating a multiple installation.

In FIG. 9, a plurality of systems 200 can receive water from a central reservoir 210 defined by a containing levee. A source of water 30 can be pumped or gravity fed to reservoir 210 from a well, surface source (lake, river, stream, bay, etc.), or from a utility company or the like. Each system 200 discharges effluent to a common drainage ditch 300 or returned to a reservoir for other use, e.g., agriculture and/or low density fish rearing.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for producing oxygen enriched water for growing of aquatic animals, comprising:
   (a) a deep water well, for receiving water at a depth from the earth's strata below the surface of the earth;
   (b) means for diffusing pressurized oxygen into the water in the well, at a depth, so that the water is under sufficient pressure to dissolve the oxygen in the water;
   (c) means within the well for lifting the water containing dissolved oxygen up to the surface of the earth; and
   (d) a vessel, positioned substantially at the earth's surface, for receiving the oxygen-dissolved water from the well, and dispersing the water into the vessel, so that fish contained in the vessel receive the oxygen enriched water.

2. The system in claim 1, wherein the well is at least thirty (30') feet.

3. The system of claim 1, wherein the injecting means includes pressurized vessel.

4. The system in claim 1, wherein a container of liquid oxygen is the source of said pressurized oxygen.

5. The system of claim 4, further comprising means for converting the liquid oxygen to a gaseous form.

6. The system of claim 5, wherein the converting means is a heat exchanger.

7. The system in claim 1, wherein the pressurized oxygen diffused into the water within the deep water well further provides a pumping means for lifting the water from within the well upward toward the surface.

8. The system in claim 1, wherein there may be further provided a secondary water pond for receiving oxygen diffused water from the vessel.

9. The apparatus in claim 1, wherein the deep water well further includes a vessel containing pressurized oxygen for delivering the pressurized oxygen into the deep water well and diffusing the oxygen into the water contained within the well.

10. The apparatus in claim 1, wherein the means for diffusing the pressurized oxygen further includes a plurality of nozzles positioned within the deep water well, each nozzle providing a source of oxygen under pressure within the water in the well, so that the oxygen is diffused into the water within the well.

11. The apparatus in claim 1, wherein the means for lifting the water containing dissolved oxygen further includes the oxygen returning to the gaseous form within the water the gaseous oxygen providing a buoyant factor to the water as the water is moved to the surface of the earth that includes a gradual expansion of oxygen bubbles as the bubbles rise and pressure decreases.

12. A method for producing oxygen enriched water for growing aquatic animals comprising the steps of:
   (a) forming a deep water well that extends a depth below the earth's surface;
   (b) diffusing pressurized oxygen into the well water at a depth so that the water is under sufficient pressure to dissolve oxygen into the water, producing oxygen enriched water;
   (c) lifting the produced oxygen enriched water from the well surface of the earth; and
   (d) transmitting the oxygen enriched water from the well to a vessel containing fish that will receive the oxygen enriched water.

13. The method of claim 12 in step "b", the oxygen is diffused by using a pressurized oxygen containing vessel that delivers the pressurized oxygen via a conduit into the deep water well.

14. The method of claim 12 wherein in step "b", a plurality of nozzles are positioned within the deep water well, each nozzle providing a source of oxygen under pressure within the water in the well so that oxygen is diffused into the water within the well.

15. The method of claim 12 wherein the step "c", the lifting includes using the gradual expansion of oxygen bubbles as the bubbles rise and pressure decreases to provide a buoyant factor to the well water as the water is moved toward the surface of the earth.

16. The method of claim 12 wherein in step "b", the pressurized oxygen is diffused into the well water at a depth of at least thirty (30') feet.

* * * * *